United States Patent [19]

Greer

[11] Patent Number: 4,899,306

[45] Date of Patent: Feb. 6, 1990

[54] TEST INTERFACE CIRCUIT WHICH GENERATES DIFFERENT INTERFACE CONTROL SIGNALS FOR DIFFERENT TARGET COMPUTERS RESPONDING TO CONTROL SIGNALS FROM HOST COMPUTER

[75] Inventor: Steven C. Greer, Lisle, Ill.

[73] Assignee: American Telephone and Telegraph Company, AT&T Bell Laboratories, Murray Hill, N.J.

[21] Appl. No.: 769,138

[22] Filed: Aug. 26, 1985

[51] Int. Cl.[4] .................... G06F 15/20; G06F 9/06
[52] U.S. Cl. .................... 364/900; 364/916.4; 364/948.1; 364/949.4; 364/946.7; 371/16.1; 371/22.2
[58] Field of Search .................... 371/15, 20, 16; 324/73 R, 73 AT; 364/200 MS File, 900 MS File, 480, 579, 580

[56] References Cited

U.S. PATENT DOCUMENTS

| | | | |
|---|---|---|---|
| 3,846,763 | 11/1974 | Riikonen | 364/200 |
| 4,057,847 | 11/1977 | Lowell et al. | 364/200 |
| 4,069,510 | 1/1978 | Carlow et al. | 364/200 |
| 4,127,896 | 11/1978 | Raslavsky | 364/200 |
| 4,195,258 | 3/1980 | Yen | 324/73 AT |
| 4,231,087 | 10/1980 | Hunsberger et al. | 364/200 |
| 4,315,310 | 2/1982 | Bayliss et al. | 364/200 |
| 4,317,199 | 2/1982 | Winslow | 371/16 |
| 4,402,055 | 8/1983 | Lloyd et al. | 364/579 |
| 4,485,439 | 11/1984 | Rothstein | 364/200 |
| 4,606,025 | 8/1986 | Peters et al. | 371/20 |
| 4,654,781 | 3/1987 | Schwartz et al. | 364/200 |

Primary Examiner—Thomas Lee
Attorney, Agent, or Firm—Peter Visserman

[57] ABSTRACT

A general purpose computer test interface is used to test various types of computers having differing input/output characteristics. The interface comprises a control unit which is responsive to messages from a controlling host computer to generate a unique set of type control signals for each computer type to be tested. Interfce control logic circuits combine the type control signals with bus control signals from a target computer under test to adapt the interface for communication with each of the different types of targets defined by the type control signals.

6 Claims, 3 Drawing Sheets

TEST INTERFACE CIRCUIT WHICH GENERATES DIFFERENT INTERFACE CONTROL SIGNALS FOR DIFFERENT TARGET COMPUTERS RESPONDING TO CONTROL SIGNALS FROM HOST COMPUTER

TECHNICAL FIELD

The invention relates to circuits for providing a computer test interface and more specifically, to adaptable test interface circuits for use in testing different types of computers.

BACKGROUND OF THE INVENTION

Distributed processing systems such as large digital telecommunication switching systems may have a number of independently operating microprocessors of different types to perform various functions of the system. Each of the microprocessors has to be programmed and tested. Some testing may be done by emulation on a general purpose computer, but ultimately, a new program has to be integrated with the hardware and software structure of the microprocessor and tested as part of the integrated system. To perform integration testing of the new program of a microprocessor, a test access is required.

One prior art approach is to use in-circuit emulation whereby a special processor adapted for testing is inserted in the system in the place of the processor of the system. This has obvious drawbacks in that the program is not tested on the processor on which it will ultimately be run. Another prior art approach is to provide an interface circuit to the microprocessor on which the program will be run in order to provide stimuli to the microprocessor and to observe its reaction. Such an interface circuit is connected to the peripheral bus of the microprocessor to be tested and is provided with circuitry which assures compatibility between the test apparatus and the microprocessor to be tested. However, there are a number of different types of microprocessors made by a variety of manufacturers which have different characteristics and under the known prior art schemes, a new interface must be designed for each microprocessor to be tested in order to assure compatibility between the diagnostic apparatus and the unit to be tested.

SUMMARY OF THE INVENTION

In accordance with this invention an adaptable interface circuit is provided, connectable to the peripheral bus of a processor to be tested and including an interface control unit and adaptable control circuits and address decoders. The control unit generates a unique set of control signals for each type of processor to be tested and the control circuits are responsive to these control signals to convert control and address signals from different types of processors to be tested into a set or interface control signals. Advantageously, a single interface circuit constructed in accordance with the principles of this invention may be used to test a variety of types of microprocessors having different peripheral bus address and control configurations, in response to input signals from a test system defining the type of processor to be tested.

In one embodiment of the interface circuit of this invention, a random access memory is provided in the interface circuit to which a program may be transferred and from which a program may be executed by the processor under test. Adaptable control circuits and address decoders make the memory available to different types of computers having different addressing schemes. Advantageously, this arrangement allows a program to be modified in the random access memory and executed in its modified form during the execution of a test. A data buffer, which is responsive to control signals derived from signals defining processor type and signals from the processor under test, provides data bus compatibility between the various types of processors and the random access memory.

DETAILED DESCRIPTION

A test interface circuit in accordance with this invention provides access from a host test computer to any of a variety of types of target computers to be tested. The target computer may, for example, be any of several commercially available microprocessors. There are a number of different types of microprocessors manufactured by a variety of companies, each having unique input/output characteristics. The test interface of this invention provides access from a host computer which defines the type of target computer to be tested. The interface circuit adapts its circuitry to convert signals from the target to a set of internal control signals such that the same interface circuit can be used to test several types of target computers.

Figure 1:
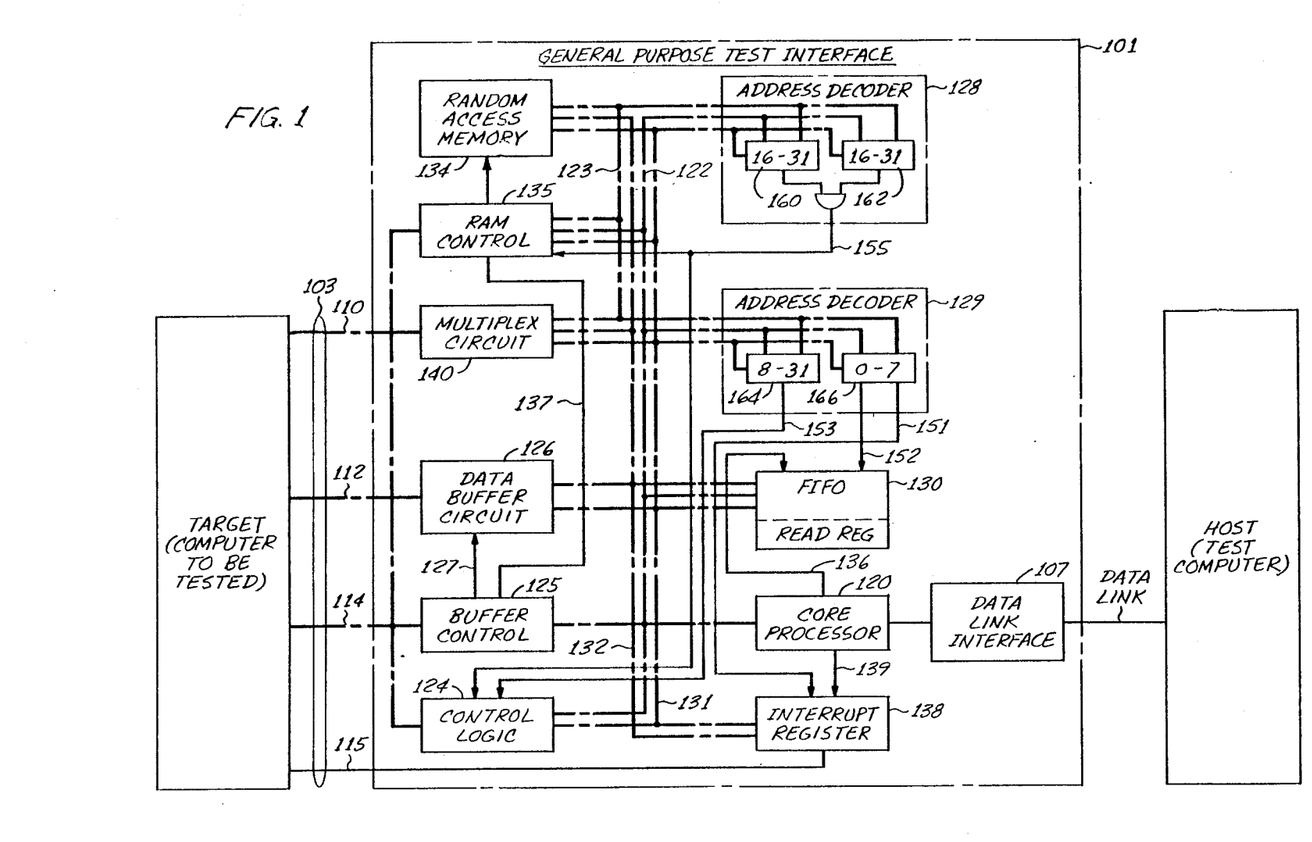
FIG. 1 is a block diagram representation of a test interface arrangement in accordance with the invention.

FIG. 1 is a block diagram representation of an illustrative general purpose test interface 101 embodying the principles of this invention. The interface comprises a connection arrangement 103 for connecting to the target computer and a data link interface 107 for connection to the host computer. The target connection includes an address bus 110 which may be connected to the address bus portion of the peripheral bus of the target computer and a data bus 112 which may be connected to the data bus portion of the peripheral bus of the target computer. Similarly, a control bus 114 may be connected to control leads such as read, write and synchronizing leads of the target computer, and an interrupt lead 115 may be connected to an interrupt input point of the target computer.

The general purpose test interface circuit 101 comprises a processor 120, referred to as a core processor, which may be any well-known microprocessor or like device such as, for example, the commercially available Motorola 68000 processor. A host test computer connected to the data link interface 107 communicates with a target processor connected to the connection arrangement 103 through the general purpose interface circuit 101. The host test computer, by means of the core processor 120 has read and write access to a first-in/first-out (FIFO) data buffer 130 via bus 122. In addition, an interrupt register 138 is provided which consists of several bits which may be set by the core processor 120 via bus 139 or from an external interrupt source. Any one or more of these bits being set provides an interrupt to the target computer on interrupt lead 115. The target has access to FIFO 130, interrupt register 138 and random access memory 134. The core processor 120, in response to configuration data received from the host provides a unique set of processor type control signals to control logic circuit 124, buffer control circuit 125 and RAM control circuit 135 via bus 122. These processor type control signals are used to configure each of the circuits so as to interpret bus control signals such as read/write and data strobes received from the target under test via bus 114 in the appropriate manner for the type of processor being tested. The control logic circuit 124, buffer control circuit 125 and RAM control circuit 135 generate interface control signals which control the handling of addresses and data within the test interface circuit 101. The operation of these three circuits will be discussed in subsequent paragraphs with respect to FIGS. 2, 3 and 4.

The target computer to be tested will have a program memory which has been previously loaded with programs to execute various functions in the target computer. The target will be responsive to an interrupt on interrupt lead 115 to read the interrupt register 138. The target transmits a predetermined peripheral address on address bus 110, or on data bus 112, in the event that the particular computer being tested uses a multiplexed data/address bus in which the address appears on its data bus. Address bus information occurring on address bus 110 will be applied directly to the multiplex circuit 140 and address information occurring on bus 112 will be passed through the data buffer circuit 126, under control of buffer control 125 and control logic 124, onto internal bus 132. From this bus it will also be applied to the multiplex circuit 140. The multiplex circuit 140 under control of the control logic 124 selects the address information from either bus 110 or bus 132 and transmits it to bus 123. This bus is connected to address decoder 129. Address decoder 129 comprises match circuits 164 and 166 which compare the upper bits of the received peripheral address, for example, bits 8 through 23, with data latched into the address decoder from core processor 120 via bus 122. This data will have been supplied to the core processor from the host test computer. If the mach circuitry indicates that the address received is an appropriate peripheral address for the general purpose test interface circuit, the remainder bits of the address, for examples, bits 0 through 7 are decoded to generate an interrupt register enable signal on lead 151. This will cause the interrupt register to place its contents on the internal data bus 132, to be passed through the data buffer circuit 126 under control of the buffer control 125 and control logic 124 onto data bus 112 and the target computer peripheral bus. The control logic 124 will also send an appropriate acknowledge signal to the target via bus 114. Based on the interrupt register information, the target computer will read the FIFO 130 at a predefined address if the interrupt originated from core processor 120. Otherwise, it will perform other functions defined by external interrupts. The target computer also has a write access to the interrupt register 138 in a similar manner, to reset the interrupt bits.

The test sequences of the target computer may include the writing of data to a particular peripheral address which corresponds to the address of the FIFO 130. The FIFO may be a standard buffer employing single byte (8 bits) words. The target computer may employ a data bus which is one, two or four bytes wide and for test purposes peripheral bus write operations to the FIFO may be limited to single byte words. The addressing of the FIFO proceeds in the manner described above with respect to the interrupt register 138. The address decoder 129 upon having found an address match and decoding the appropriate bits of the address will generate a FIFO enable signal on lead 152. Data to be written in the FIFO or to be read from the FIFO will be transferred via connecting bus 112, data buffer 126, and internal bus 132. The core processor 120 also has read/write access to the FIFO 130 by means of enable signals via lead 136 and data transfers via bus 122. Associated with the FIFO 130 is a read register which is a status register which indicates whether or not the FIFO is empty and the read/write direction of the FIFO. Its access is via bus 122 or bus 132. Both the target and the core processor can read this register. The core only controls the direction of the FIFO. In this manner, by use of the FIFO 130, data words are communicated between the target processor and the core processor, and ultimately the host.

A number of small computers have their programs stored in read-only memory (ROM) which cannot be readily altered during testing. In order to allow a user, through the host computer, to change a program during the testing operation, the general purpose interface circuit 101 has been provided with a random access memory 134. The target computer may be instructed to copy the contents of its program memory in the random access memory 134 or the program may be downloaded from the host computer. The target can be instructed by means of a test program to execute its programs from the random access memory. This allows the user to modify the target programs during testing. The host computer accesses the memory 134 through the core processor 120 which communicates with the target by means of the FIFO 130. The target reads the information from the FIFO 130 and writes it into memory 134. Alternatively, the core processor may be given direct access to the memory 134 to transfer information from the host. The address for the random access memory is defined by data transmitted from the core processor via bus 122 to the address decoder 128. The address decoder includes compare circuitry which compares the upper bits of the address, for example, bits 16 through 31 to determine that the address received is in a proper address range for the RAM 134. Bits 0 through 15 of the address may then be used to identify any one of 65,536 locations in that range. The compare circuitry comprises two comparators 160 and 162, one of which indicates whether the address is less than an upper limit and the other indicates whether the address is greater than a lower limit.

Different types of processors use varying sizes of data buses. The standard sizes are one, two or four bytes. To accommodate four bytes, or 32 bits, the random access memory 134 is divided into four sections, or memory banks, each capable of storing words one byte in length. Furthermore, various microprocessors having two or four byte buses are capable of transmitting data words in only certain of the bytes, which is generally indicated by control leads which are transmitted to the general purpose test interface 101 on bus 114. These control leads are connected to the RAM control circuit 135 as well as the control logic 124 and buffer control 125. These control circuits cooperate to control the data buffer circuit 126 and the RAM 134 to transmit and store, respectively, the appropriate data bytes as defined by the control leads from the target.

The data buffer circuit 126 may consist of a number of gate circuits capable of selectively transferring bytes from bus 112 to bus 132 and vice versa under control of buffer control 125. In the case that the target computer employs a one-byte bus, the RAM control 135 examines bits 16 and 17 of the address, to select a memory bank and bits 0 through 15 define single byte locations in the selected bank. To accomplish the transfer to the appropriate bank, the data buffer circuit 126 is equipped to transfer a single byte from the lowest byte position of data bus 112 to any one of the four byte positions of the data bus 132 and vice versa. In the case of a two-byte data bus, the data buffer circuit 126 is controlled to transfer data bytes from the lower two bytes of bus 112 to either the lower two or uper two bytes of bus 132, and vice versa. In the case that the target has a 32 bit data bus, all four bytes of bus 112 are transmitted to bus 132 or vice versa. The data buffer circuit 126 may simply comprise the appropriate number of gate circuits to accomplish the transfer under control of four encoded control leads generated by the buffer control 125 and described later herein with respect to FIG. 3. Alternatively, the data buffer circuit may be designed using so-called tridirectional buffers, which are commercially available integrated circuit buffers.

The multiplex circuit 140 comprises the plurality of gating circuits such as commercially available integrated circuit multiplex devices which selectively transfer address information from bus 110 or bus 132, or from both to internal address bus 123. This circuit operates under control of the cocntrol logic 124. For certain target computers an address may appear on the address bus 110 or on the data bus 112 or partially on each, in which case the multiplex circuit must be enabled to take certain bits from bus 110 and other bits from bus 132 to transmit a full address to the address decoders 128 and 129.

Figure 2:
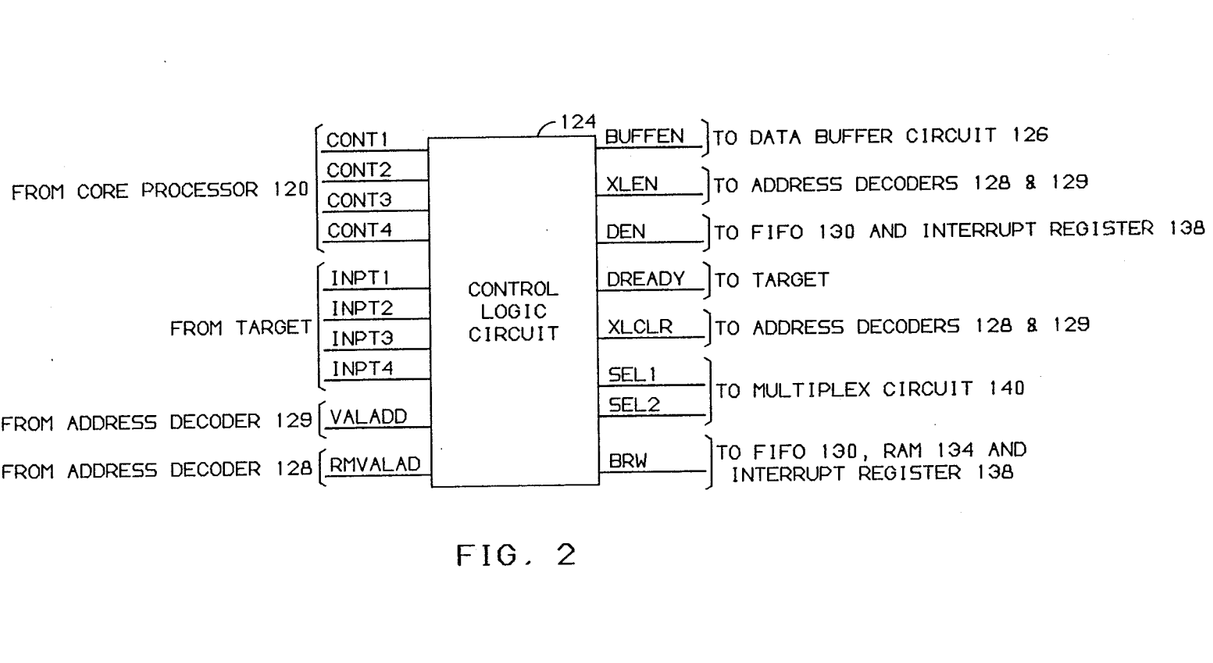
FIGS. 2, 3 and 4 are detailed representations of the input and output leads of the control circuits of FIG. 1 which control the operation of the interface in a variable manner for different types of target computers to be tested.
Figure 3:
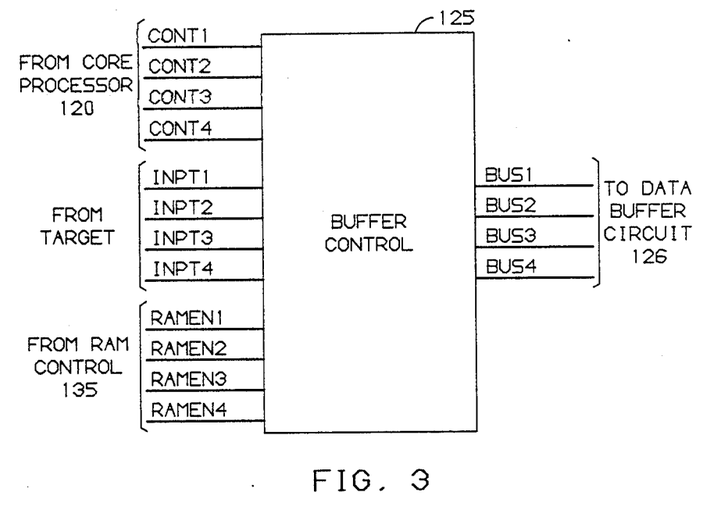
Figure 4:
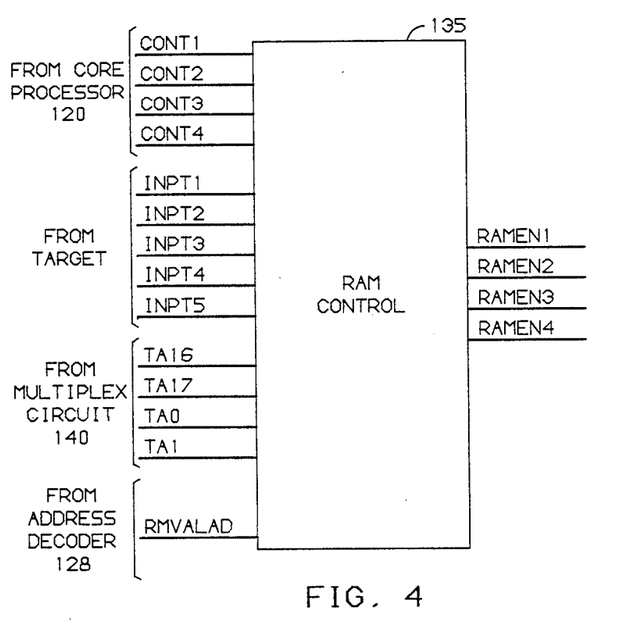

FIGS. 2, 3, and 4 show the input and output control leads for the control logic circuit 124, the buffer control 125 and the RAM control 135, respectively. These circuits are logic circuits in which the output leads are derived by logically combining the logic values of signals occurring on the input leads. These circuits will also provide timing where necessary to assure proper timing of the data transfer control signal in a well-known manner. Each of the circuits receives four or five INPT leads. These are connected to control leads from the target processor to be tested as represented by bus 114 in FIG. 1 and represent different control signals for the different types of computers to be tested. By way of example, Table 1 lists four different well-known microprocessors, the Motorola 68000, Motorola 68020, WE 3 2100 microprocessors, and the Intel 8086 microprocessor with the multiplexed address data bus. The table shows the connection of the target control leads to leds INPT1 through INPT5. For the Motorola 68000 microprocessor, INPT1 is a data strobe for the lower byte of the data bus, INPT2 is a read/write indication and INPT3 is a data strobe for the upper byte of the 16-bit data bus, with INPT4 and INPT5 not used. For the Motorola 68020 microprocessor INPT1 is a data strobe, INPT2 is a read/write indication, INPT3 and INPT5 indicate the size of the enabled portion of the 32-bit data bus (e.g. 1, 2, or 4 bytes). For the WE 32100 microprocessor INPT1 is a data strobe, INPT2 is a read/write indication, INPT3 and INPT5 are size indications for the 32-bit data bus. For the Intel 8086 microprocessor INPT1 is an address latch enable indication, INPT2 is a data transmit/receive indication, INPT3 and INPT4 are read and write indications and INPT5 indicates upper byte enable of the 16-bit bus. Clearly, the table can be expanded to include other targets with different control lead characteristics.

TABLE 1

|  | INPT1 | INPT2 | INPT3 | INPT4 | INPT5 |
|---|---|---|---|---|---|
| Motorola ® 68000 | LDS | R/W | UDS | | |
| Motorola ® 68020 | DS | R/W | SIZ 0 | | SIZ 1 |
| WE ® 32100 | DS | R/W | DSIZ E1 | | DSIZ E2 |
| Multiplexed Intel ® 8086 | ALE | DT/R | RDO | WRO | BHE |

Each of the circuits 124, 125 and 135 also have input leads labeled CONT1 through CONT4. These are control leads which carry control signals generated by the core processor 120, digitally encoding the type definition of the target computer. By way of example, the coding for the four processors mentioned above is shown in Table 2. Any consistent coding scheme may be used and the table may be expanded to accommodate as many target computers as desired. The Motorola 68000 microprocessor, for example, has been assigned the code 1001 for the four control leads. Thus, when a processor of this designation is to be tested the core processor 120 must generate control signals according to this code. The host test computer has a table corresponding to Table 2 and is responsive to a processor designation by the user to transmit this code to the core processor 120 via the data link interface 107.

TABLE 2

|  | CONT4 | CONT3 | CONT2 | CONT1 |
|---|---|---|---|---|
| Motorola ® 68000 | 1 | 0 | 0 | 1 |
| Motorola ® 68020 | 1 | 0 | 1 | 0 |
| WE ® 32100 | 1 | 0 | 1 | 1 |
| Multiplexed Intel ® 8086 | 1 | 1 | 0 | 0 |

Referring to FIG. 2, it can be seen that the control logic circuit 124, in addition to input leads INPT1 through INPT4 from the target and control leads CONT1 through CONT4 from the core processor also has an input VALADD generated by the address decoder 129 on lead 153, and an RMVALAD input from decoder 128 on lead 155. A signal indicating a valid address is generated on lead VALADD by decoder 129 when its comparators, referred to earlier, indicate that a valid address has been detected. Similarly, a signal on the RMVALAD lead indicates that a valid address has been decoded by the RAM decoder 128.

These various input leads are logically combined to generate output leads which are used to control various operations of the general purpose test interface 101. The output BUFFEN is connected to the data buffer circuit 126 via the internal bus 131 and serves to enable this circuit to transfer data from bus 112 to bus 132 or vice versa. The data buffer circuit is further controlled by buffer control 125 which will be discussed later herein with respect to FIG. 3. The output of control logic 124 labeled XLEN is connected to address decoders 128 and 129 and RAM control 135 via bus 131 and serves to latch an address occurring on bus 123 in the circuits. Output DEN is connected to FIFO 130 and interrupt register 138v ia bus 131 and serves to enable these circuits to receive or transmit data on data bus 132. The output labeled DREADY is connected to the target via bus 114 at the appropriate input to indicate to the target that data transmitted by the target has been received or data to be transmitted to the target is available on data bus 112. The output XLCLR is connected to decoders 128 and 129 via bus 131 and is used to clear these decoders at the end of a bus cycle, which also results in the disabling of output signals generated by the decoders and, thus, terminates the operation of a bus cycle in the general purpose test interface 101. Outputs SEL1 and SEL2 are applied to the multiplex circuit 140 via bus 131 and control the selection of inputs by the circuit. For example, SEL1 causes the multiplex circuit 140 to transfer information occurring on bus 110 to bus 123. SEL2 is used in case the process under test is an Intel 8086 microprocessor with a multiplex bus where the lowest 16 address bits appear on the data bus 132 (via bus 112 and data buffer circuit 126). The complete address is transferred by the multiplex circuit 140 to bus 123. Additionally, the control logic circuit 124 generates a read/write indication in the form output BRW which is applied to RAM 134, FIFO 130, and interrupt register 138 via bus 131 and controls the read or write gating in these circuits.

FIG. 3 shows the inputs and outputs of the buffer control 125. This circuit generates four control outputs labeled BUS1 through BUS4 which are applied to data buffer 126 via bus 127. The data buffer 126 is connected via a 32-bit bus 112 to the target processor being tested and by another 32-bit bus, bus 132, to the various units of the general purpose test interface 101. Target processors of different types may employ a single byte (8-bits) data bus or a 2- or 4-byte data bus. In this exemplary embodiment the FIFO 130 employs single byte words and the random access memory 134 employs 4-byte words. It is expected that a data word to be transferred to the FIFO 130 will consist of a single byte. However, data words to be stored in the 32-bit random access memory may be transferred on bus 112 as 1, 2 or 4-byte words. The byte position in the memory is determined by the RAM control 135, as described below with respect to FIG. 4, which generates four outputs RAMEN1 through RAMEN4. As shown in FIG. 3, the buffer control 125 receives the RAMEN inputs as well as the control inputs CONT1 through CONT4 from the core processor and control signals from the target on leads INPT1 through INPT4. The connection of the RAM enable signals RAMEN1 through RAMEN4 from the RAM control 135 to the buffer control 125 is shown in FIG. 1 as interconnecting leads 137.

The data buffer control signals BUS1 through BUS4 are encoded using binary coding, to control the data buffer 126 to perform the various transfer operations required between the buses 112 and 132. In this illustrative embodiment, there are 14 different gating functions that may be performed by the data buffer circuit 126. They are as follows: From the first byte position of bus 112 to the first byte position or the second byte position or the third byte position or the fourth byte position or bus 132 and vice-versa; from the first and second byte position of bus 112 to the first and second or third and fourth byte positions of bus 132 and vice-versa; and from all byte positions of bus 112 to all byte positions of bus 132 and vice-versa.

FIG. 4 shows the inputs and outputs of the RAM control circuit 135 which generates the random access memory enable signals on output leads RAMEN1 through RAMEN4. These outputs are generated by logically combining control leads CONT1 through CONT4 and INPT1 through INPT5, shown in Tables 1 and 2, respectively, together with address bits TA0, TA1, TA16 and TA17. These address bits are taken from the internal address bus 123 and are part of the address for the random access memory 134. When the target processor to be tested employs an 8-bit data bus, address bits 16 and 17 may be decoded to designate the first through the fourth byte position of the random access memory 134. In the case of a target employing a 16-bit bus, bit 17 is used to designate the upper or lower half. In the case of a 32-bit bus, the address bits 0 and 1 are used in conjunction with the size bits INPT3 and INPT5 indicating the number of bytes received from the target, to select memory banks.

By way of example, the operation of the general purpose test interface 101 is described in connection with the testing of a Motorola 68000 microprocessor based computer. A read cycle, wherein data is transferred from the interface 101 to the target, or a write cycle, wherein data is transferred from the target to the interface begins when data strobes LDS or UDS are generated by the target. As indicated in Table 1, these data strobes are translated into inputs INPT1 and INPT3. As indicated in Table 2, the Motorola 68000 microprocessor is coded such that control leads CONT4 and CONT1 are logical "1" and CONT3 and CONT2 are logical "0". This combination of the CONT leads applied to the control logic circuit 124 causes its output lead SEL1 to be activated which in turn controls the multiplex circuit 140 to transfer information from the address bus 110 to the internal bus 123. The state of the INPT1 and INPT3 leads, indicating activation of the lower and upper data strobes LDS and UDS, respectively, will activate output XLEN of control logic 124 to latch the address occurring on bus 123 into the address decoders 128 and 129. If the upper bytes of the received address match the address information provided to address decoder 129 from the core processor 120, address decoder 129 will generate a valid address signal on the VALADD input to the control logic 124. The decoder 129 will also further decode the lower portion of the address and generate an enable signal on lead 152 to the FIFO 130 or on lead 151 to interrupt register 138. Thereafter, output XLEN of control logic 124 is negated and output DEN is asserted and transmitted to FIFO 130 and interrupt register 138 to allow data to be gated to or from bus 132. The control logic circuit 124 will apply an appropriate read/write signal BRW to the random access memory, FIFO 130 and register 138 to direct either a read or a write operation. However, only the unit receiving the enable signal from address decoder 129 will be enabled to perform the read or write operation. The DREADY signal will be sent from the control logic 124 to the data acknowledge input of Motorola 68000 microprocessor to indicate that the data is being received or sent. In the event that the received address pertains to the random access memory 134 rather than the FIFO 130 or interrupt register 138, the address decoder 128 transmits the RMVALAD signal to the control logic 124. Thereafter, signal XLEN will be negated and the buffer enable signal BUFFEN and data ready signal DREADY will be generated at the appropriate time. The control logic circuit 124 provides for timing delay where necessary to assure appropriate timing in the communications with the target processor and to assure proper timing of the generated signals.

The Motorola 68000 microprocessor employs a 16-bit data bus. In this illustrative embodiment, communications between the target and the FIFO 130 or interrupt register 138 are limited to single byte transfers. The test programs for the target processor will be written such that the target will use only a single byte position of its 2-byte bus. In communicating with the random access memory 134, the full 16-bit bus may be used. To accomplish the transfer of data between the target and the units of the genreal purpose test interface 101 requires the proper activation of the data buffer circuit 126. As discussed earlier, with respect to FIG. 3, buffer control 125 generates output signals BUS1 through BUS4. In the case of a single byte read from the FIFO or interrupt register, the appropriate BUS signals are generated to transfer a single byte from internal bus 132 to data bus 112 and in the opposite direction in case of a write operation to either of these two nits. The read/write indication is applied to buffer control 125 on input lead INPT2. In the event of a read or write operation to the random access memory 134, the output signals BUS1 through BUS4 are configured to transfer data between bus 112 and the upper portion of lower portion of the 32-bit data bus 132. The selection of either the upper or lower portion depends upon the state or inputs RAMEN1 through RAMEN4. These last named inputs are generated by the RAM control 135 using the state of the address bit TA17 to select the upper or lower portion.

At the end of the read or write cycle, the target data strobes UDS and/or LDS will be negated and output lead XLCLR will be activated to clear address decoders 128 and 129. This causes inputs VALADD or RMVALAD to be negated and output leads of the control logic 124 to return to their initial state.

When the target is a Motorola 68020 microprocessor, the operation of the general purpose test interface is very much the same. The state of the control leads CONT4 through CONT1 will reflect the identity of this type of target as shown in Table 2. This microprocessor employs a 32-bit data bus and provides two control signals SIZ0 and SIZ1 to define the size of the data word being transmitted on the bus. These control signals are translated into controls INPT1 through INPT5 which are used to generate the necessary internal control signals in the control logic 124, the buffer control 125, and the RAM control 135. The WE 32100, listed in Tables 1 and 2, also employs a 32-bit data bus and is handled in substantially the same way as the Motorola 68020.

The last processor listed in Tables 1 and 2 is the Intel 8086 employing a multiplexed address bus. In this case, a part of the address generated by the target appears on its data bus and must be gated through the data buffer circuit 126 before it can reach the multiplex circuit 140 and the internal data bus 123. The read or write cycle begins when the target activates the ALE (address latch enable) signal and a valid address is placed on the address-data bus. The ALE signal is seen as INPT1 at the control logic 124 and control circuits 125 and 135, as laid out in Table 1. Output BUFFEN of control logic 124 is enabled in response to signal ALE to enable data buffer 126. Bus control signals BUS1 through BUS4 are generated by the buffer control 125 to cause the address occurring on data bus 112 to pass to bus 132. Output SEL2 of control logic 124 is activated to cause the multiplex circuit 140 to pass the 16-bit address from bus 132 and a 4-bit address from bus 110 to the internal address bus 123. Control lead XLEN is activated to lach the valid address into address decoders 128 and 129. When the address matches the address information stored in address decoders 128 or 129, a valid address signal in the form of signal RMVALAD or VALADD is returned to the control logic 124. Output DEN is activated in response to the VALADD input and the DREADY output signal is generated. The read/write control signal BRW follows the state of INPT 2 which reflects the state of the data transmit/receive bit of the target, as indicated in Table 1. During the read cycle the target control lead RDO (INPT3) provides timing for data transfer and during the write cycle WRO (INPT4) provides such timing. When these are deactivated, XLCLR is activated to clear the address decoders 128 and 129 which causes VALADD or RMVALAD to become inactive.

The Intel 8086 microprocessor employs a 16-bit data bus and address bits 0 and 17 and a special control signal BHE (INPT5) are used in the RAM control logic 135 to generate outputs RAMEN1 through RAMEN4. Address bit 17 deterines whether a 16-bit data is to be placed in the upper or lower portion of a location of the random access memory 134 and address bit 0 and BHE determine whether the upper or lower byte or both are to be selected. As discussed before, these ouputs are used in the generation of data buffer control signals BUS1 through BUS4 in transferring data from the 32-bit internal bus 132 to the 16-bit bus of the target.

It is to be understood that the above-described arrangement and the specific examples discussed provide merely an illustrative application of the principles of the invention. Numerous other arrangements may be devised by those skilled in the art without departing from the spirit and scope of the invention.

What is claimed is:

1. An adaptable test interface for use with a host computer and a plurality of target computers of different types having differing input/output characteristics comprising:

memory means;

first control means, connected to said memory means, responsive to control signals from said host computer to write test data received from said host computer into and read target output data from said memory means and to generate a unique set of interpretation control signals for each computer type to be tested;

interconnecting means for connecting said first control means to said host computer;

second control means, connected to said first control means, responsive to said interpretation controll signals and control signals from a target computer to be tested for generating interface control signals; and address decoder means, connected to said second control means, responsive to said interface control signals and address signals from said target computer to generate memory control signals;

said memory means, connected to said address decoder means, responsive to said memory control signals to access memory locations defined by said address signals from said target computer and selectively transmit said test data to and store said target output data from said target computer;

whereby a target computer obtains from the memory means test data supplied by the host computer and returns target output data to the memory means for examination by the host computer.

2. An adaptable test interface for use in testing a plurality of computers of different types having differing input/output characteristics, comprising:
 data storage means;
 first control means, connected to said data storage means, responsive to control signals from a host test computer to generate a unique set of interpretation control signals for each computer type to be tested and first data storage access signals for writing test data received from said host test computer into and reading target output data from said data storage means;
 interconnecting means for connecting said first control means to said host test computer;
 second control means, connected to said first control means, responsive to said interpretation control signals and control signals from a target computer to be tested for generating interface control signals; and
 address decoder means, connected to said second control means, responsive to said interface control signals and address signals from said target computer to generate second data storage access signals;
 said data storage means, connected to said address decoder means, respnsive to said first data storage access signals to store said test data received from and transmit said target output data to said first control means and responsive to said second data storage access signals to access locations of said data storage means defined by said address signals from said target computer and to stare said target output data received from and transmit said test data to said target computer; whereby a host test computer communicates with different types of target computers via said first control means and said data storage means.

3. An adaptable test interface in accordance with claim 2 wherein said first control means is further responsive to control signals from said host to transmit data defining an address range to said address decoder means and said address decoder means comprises comparator means for comparing a peripheral address from said target computer with said data defining a valid address range to generate said second data storage control signals.

4. A general purpose test interface circuit for testing a plurality of different types of processors, comprising:
 interface memory means;
 a control unit, connected to said interface memory means, responsive to control signals from a host computer for reading data from and writing into said interface memory means and for generating a unique set of processor type control signals for each different type of processor to be tested and data words defining valid target addresses for each type of processor to be tested;
 interconnecting means for connecting said control unit to said host computer;
 logic circuit means connected to said control unit for logically combining bus control signals received from a target processor to be tested and said processor type control signals into interface control signals corresponding to the type of target processor to be tested; and
 address decoder means, connected to said control unit, responsive to address signals from said target processor and said data words defining valid target addresses to generate memory control signals;
 said interface memory means, connected to said logic circuit means and said address decoder means responsive to said memory control signals and said interface control signals for selectively storing and retrieving target processor data at memory locations defined by said address signals from said target processor.

5. An adaptable interface unit for use with a host computer which generates test control information for testing a plurality of different types of target processors having differing input/output characteristics, and a target processor to be tested, comprising:
 data link connection means for connection to said host computer;
 first control means connected to said data link connection means and responsive to said test control information for generating a unique set of processor type control signals for each type of processor to be tested;
 memory means for storing data words of a word length equivalent to the length of the longest word expected from any of said target processors;
 said first control means responsive to memory access control signals from said host computer to transfer data between said memory means and said host computer;
 data bus means connected to said memory means and comprising a plurality of bus sections;
 data buffer means for connection to said target processor, connected to said data bus means and responsive to buffer control signals to selectively transfer data words of varying word length between different types of target processors and predetermined sections of said bus means;
 second control means connected to said buffer means and said first control means, and responsive to said processor type control signals and data transfer control signals generated by said target processor to generate said buffer control signals to control said data buffer means to selectively transfer data words of a length defined by said processor type control signals and said data transfer control signals between said target processor and predetermined sections of said data bus means.

6. An adaptable interface unit for use with a host computer which generates test control information for testing a plurality of different types of target processors having differing input/output characteristics, and a target processor to be tested, comprising:
 data link connection means for connection to said host computer;
 first control means connected to said data link connection means and responsive to said test control information for generating a unique set of processor type control signals for each type of processor to be tested;
 memory means for storing data words of a word length equivalent to the length of the longest word expected from any of said target processors;
 said first control means responsive to memory access control signals from said host computer to transfer data between said memory means and said host computer;
 data bus means connected to said memory means and comprising a plurality of bus sections;

data buffer means for connection to said target processor, connected to said data bus means and responsive to buffer control signals to selectively transfer data words of varying word length between different types of target processors and predetermined sections of said bus means; and second control means connected to said buffer means and said first control means, and responsive to said processor type control signals and data transfer control signals generated by said target processor to generate said buffer control signals to control said data buffer means to selectively transfer data words of a length defined by said processor type control signals and said data transfer control signals between said target processor and predetermined sections of said data bus means;

said memory means comprising a plurality of memory sections, each section corresponding to a section of said data bus means;

said second control means comprising memory control means connected to said memory means and said first control means and responsive to said processor type control signals and said data transfer control and address signals generated by said specific target processor to generate memory enable signals to selectively enable said memory sections to store data words of a length defined by said processor type control signals and said transfer control signals from said target processor, and means responsive to said memory enable signals to generate said buffer control signals to control said data buffer means to selectively transfer data words between said specific target processor and sections of said data bus corresponding to said memory sections defined by said memory enable signals.

* * * * *